UNITED STATES PATENT OFFICE.

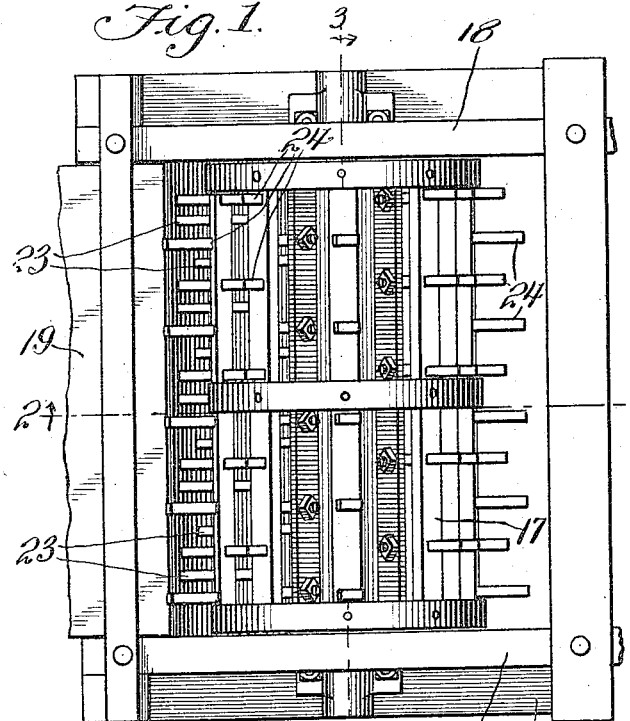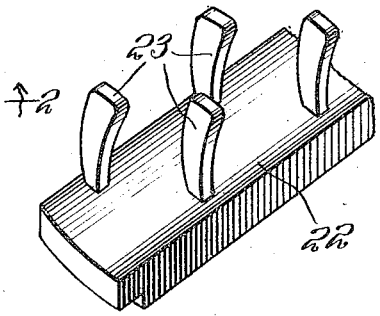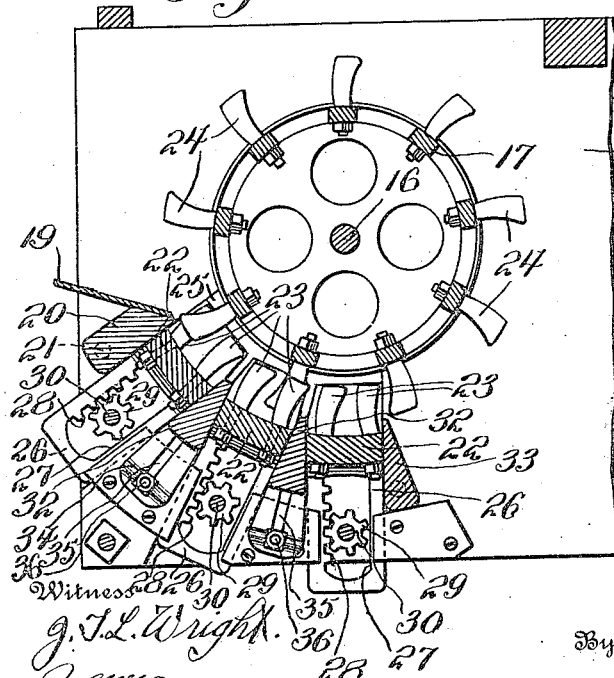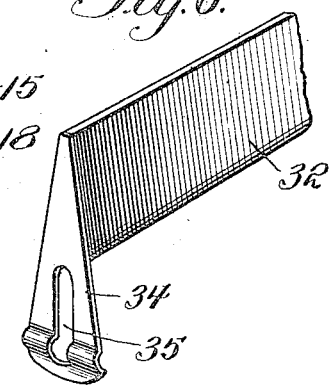

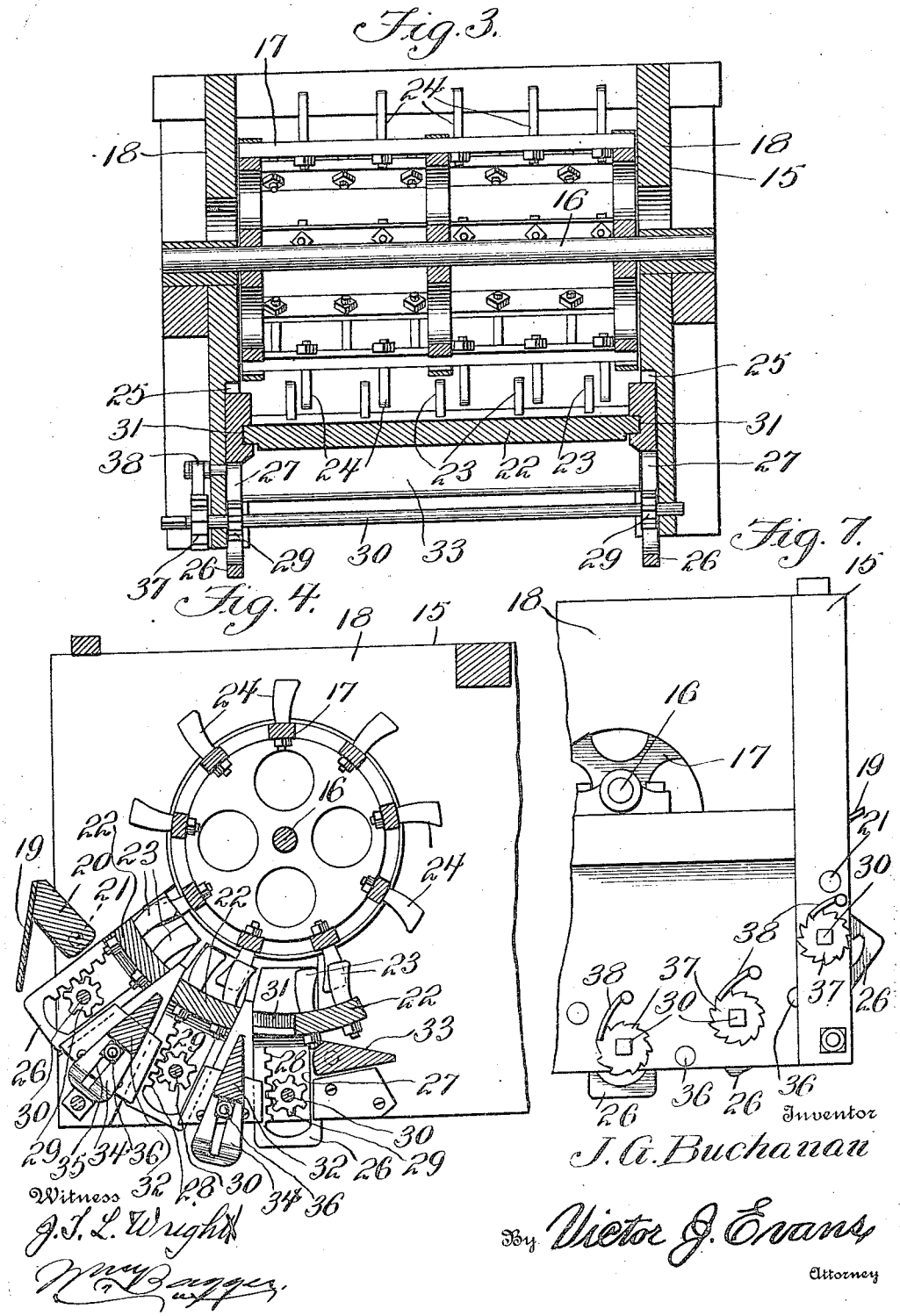

JAMES G. BUCHANAN, OF CHICKASHA, OKLAHOMA.

THRESHING-MACHINE.

1,260,140.　　　　　Specification of Letters Patent.　　Patented Mar. 19, 1918.

Application filed October 6, 1916.　Serial No. 124,142.

*To all whom it may concern:*

Be it known that I, JAMES G. BUCHANAN, a citizen of the United States, residing at Chickasha, in the county of Grady and State of Oklahoma, have invented new and useful Improvements in Threshing-Machines, of which the following is a specification.

This invention relates to threshing machines and grain separators, and it has particular reference to that part of the threshing mechanism which includes the cylindrical beater and the concave coöperating therewith.

The invention has for its object to so construct and arrange the concave bars that they may be retracted from normal position to produce what is known as a blank, the teeth of the concave being moved out of the path of the teeth of the cylinder, thereby permitting material to pass more freely as is sometimes desired.

A further object of the invention is to simplify and improve the construction and the manner of mounting and manipulating the concave bars.

A further object of the invention is to produce a threshing mechanism wherein movably supported concave bars are separated by dividers, the same being also movably supported to permit the concave bars to be removed and replaced without disassembling the frame structure of the machine.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Figure 1 is a top plan view of a portion of a threshing machine constructed in accordance with the invention.

Fig. 2 is a vertical sectional view taken on the line 2—2 in Fig. 1.

Fig. 3 is a transverse vertical sectional view taken on the line 3—3 in Fig. 1.

Fig. 4 is a vertical sectional view similar to Fig. 2 but showing the parts arranged to permit the removal of some of the concave bars.

Fig. 5 is a perspective view of one of the concave bars detached.

Fig. 6 is a perspective view of one of the dividers detached.

Fig. 7 is a detail side view of a portion of a machine equipped with the invention.

Corresponding parts in the several figures are denoted by like characters of reference.

The casing 15 is provided with bearings for the shaft 16 carrying the cylinder 17. The side walls 18 of the casing are strongly constructed and reinforced, said side walls being connected together and spaced apart in the customary manner. The feed board 19 is attached to a cross piece 20 which is pivotally supported by means of pivot members or trunnions 21 engaging the side walls, permitting the said feed board to be swung or moved to an out of the way position, as best seen in Fig. 4.

The concave is composed of a plurality of bars 22, each having upwardly extending teeth 23 that coöperate with the teeth 24 of the threshing cylinder 17, the cylinder teeth being so disposed with respect to the concave teeth as to pass through the interspaces of the latter when the machine is in operation.

The inner, opposed faces of the side walls 18 are provided with grooves or recesses 25 for the accommodation of the slides 26, said slides being disposed substantially radially with respect to the axis of the cylinder. The slides 26 are each provided with a slot 27 having a toothed side wall producing a rack 28. The slides 26 at the two sides of the casing are operable in pairs by means of pinions 29 engaging the racks 28, said pinions being mounted on shafts 30 that extend transversely through the casing, each shaft extending through the slots 27 in two opposed slides 26. Said slides are provided in their opposed faces with arcuate grooves or guideways 31 concentric with the axis of the cylinder 17, for the reception of a concave bar 22. In the accompanying drawings three concave bars have been shown, each being mounted in the guideways 31 of a pair of slides 26. It will be seen that by rotating any one of the shafts 30, the slides carrying one of the concave bars will be moved radially with respect to the cylinder, thereby varying the distance between the cylinder and the concave bar, and varying the extent to which the concave teeth will be permitted to project between the teeth of the cylinder.

Interposed between the concave bars are dividers 32, the same consisting of bars of wedge-shaped cross section, the said bars being so constructed and proportioned that the opposed faces of any two of said bars will lie in parallel planes, thereby serving as guides for the concave bars when the latter are being adjusted radially, and also serving to prevent edgewise displacement of said concave bars from the guideways 31. The pivotally supported cross piece 20 carrying the feed board 19 coöperates with the foremost divider to constitute a guide for the foremost concave bar. A rear cross bar 33 is permanently fixed in the casing to coöperate with the rearmost divider in forming a guide means for the rearmost concave bar. Each of the dividers 32 that are disposed intermediate the concave bars is provided with downwardly extending brackets 34 having slots 35 for the passage of securing bolts 36. When said bolts are loosened, the dividers may be lowered, as seen in Fig. 4 of the drawings.

The adjusting shafts 30 are each provided with a ratchet wheel 37 engaged by a pawl 38 on the side wall of the casing to prevent reverse rotation. The respective shafts may be turned by means of a crank or wrench, not shown, for the purpose of effecting adjustment of the slides carrying the concave bars.

As will be seen from the foregoing description, taken in connection with the drawings hereto annexed, any one or more of the concave bars may be adjusted radially with respect to the threshing cylinder, thereby regulating the extent of the interengaging portions of the teeth according to the nature and condition of the material that is to be operated upon. In some cases it is desirable to substitute blanks for the toothed concave bars, thereby subjecting the material that is to be operated upon to the action of the cylinder teeth only.

In machines as ordinarily constructed, the toothed concave bars are usually removed and blank bars substituted at a great expense of time and labor. By the present invention it is only necessary to lower the concave bars until the ends of the teeth lie in the planes of the inner faces of the dividers, as well as of the cross piece 20 and the rear cross bar 33. The interspaces between the concave bars will then quickly become packed with straw and chaff which will perform the function of blank concave bars. Should it be desired to remove the concave bars, in the event of breakage, or for the purpose of substituting others of a different type, it is only necessary to swing the cross piece 20 carrying the feed board in a forward direction and to loosen the bolts 36, permitting the dividers 32 to be lowered, after which an operator standing in front of the machine may readily remove and replace the concave bars by simply sliding them from the guideways 31 in the slides 36. The improved device is of simple construction, and it may be manufactured and installed at small expense.

Having thus described the invention, what is claimed as new, is:—

1. In a threshing machine, a cylinder, slides supported for radial movement with respect to the cylinder and having arcuate guideways concentric with the axis of the cylinder, and concave bars supported in the guideways, in combination with dividers interposed between the slides and preventing transverse displacement of the concave bars.

2. In a threshing machine, a cylinder, slides supported for radial movement with respect to the cylinder and having arcuate guideways concentric with the axis of the cylinder, and concave bars supported in the guideways, in combination with radially adjustable dividers interposed between the slides and preventing transverse displacement of the concave bars.

3. In a threshing machine, a cylinder, slides supported for radial movement with respect to the cylinder and having arcuate guideways concentric with the axis of the cylinder, and concave bars supported in the guideways, in combination with radially adjustable dividers interposed between the slides and preventing transverse displacement of the concave bars, said dividers having terminal slotted brackets, bolts, and fastening members engaging the same.

4. In a threshing machine, a cylinder, radially movable slides having arcuate guideways, a pivotally supported front cross piece carrying a feed board, a stationary rear cross bar, and dividers of wedge-shaped cross section interposed between the slides, said slides and concave bars being guided between the opposed faces of the dividers and the front and rear cross bars.

5. In a threshing machine, a cylinder, radially movable slides having arcuate guideways, a pivotally supported front cross piece carrying a feed board, a stationary rear cross bar, and dividers of wedge-shaped cross section interposed between the slides, said slides and concave bars being guided between the opposed faces of the dividers and the front and rear cross bars, said dividers being supported for radial sliding movement.

6. In a threshing machine, a cylinder, radially movable slides having arcuate guideways, a pivotally supported front cross piece carrying a feed board, a stationary rear cross bar, and dividers of wedge-shaped cross section interposed between the slides, said slides and concave bars being guided between the opposed faces of the dividers and the front and rear cross bars, said dividers being provided with terminal slotted brackets, and fastening members engaging the same.

In testimony whereof I affix my signature.

JAMES G. BUCHANAN.

Copies of this patent may be obtained for five cents each, by addressing the "Commissioner of Patents, Washington, D. C."